Jan. 9, 1940.   L. E. PUCHER   2,186,147
COVER LOCK FOR STORAGE BATTERIES
Filed Sept. 4, 1937

INVENTOR.
LEO E. PUCHER
BY
Kwis Hudson & Kent
ATTORNEYS

Patented Jan. 9, 1940

2,186,147

UNITED STATES PATENT OFFICE 2,186,147

COVER LOCK FOR STORAGE BATTERIES

Leo E. Pucher, Cleveland, Ohio, assignor to Willard Storage Battery Company, Cleveland, Ohio, a corporation of West Virginia Application September 4, 1937, Serial No. 162,497

1 Claim. (Cl. 136—170)

This invention relates to storage batteries and particularly to what may be aptly termed a cover lock to prevent the cover from being pushed upwardly and the consequent breakage or loosening of the sealing compound which normally seals the cover in place in the upper part of the container.

I have found that occasionally, and particularly when the cover is integrally united with the terminal posts, as by being lead-burned to lead sealing sleeves embedded in the cover, the battery element within the cell apparently, by reason of growth on the plates or loose element, pushes the cover upwardly and loosens the sealing compound, thus destroying the seal and making it possible for electrolyte to leak from the battery.

The principal object of the present invention is to provide a cover lock which holds the cover down in place and therefore overcomes the objection mentioned above.

Preferably I attain this object by providing a cover lock in the form of locking strips which are fitted or located between the flange at the lower edge of the cover and abutments of the battery case or into the wall of the case. These locking strips may be formed in various ways and, after the cover is in place, may be inserted and moved to locking position in different ways, as will be described in detail hereinafter.

The invention may be further briefly summarized as consisting in certain novel details of construction and combinations and arrangements of parts which will be described in the specification and set forth in the appended claim.

In the accompanying sheet of drawings.

Figure 3:
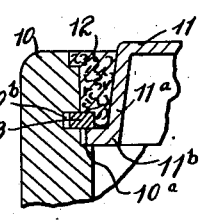
Fig. 3 is a similar view with the locking strip moved to locking position and with the sealing compound applied.
Figure 5:
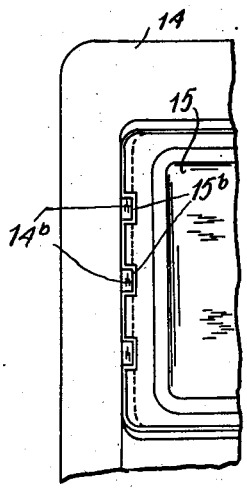
Figure 6:
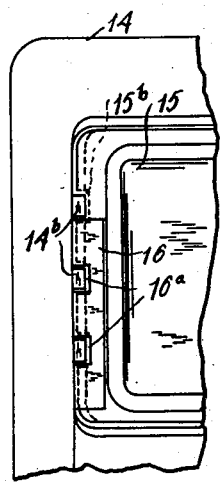
Figures 7, 8:
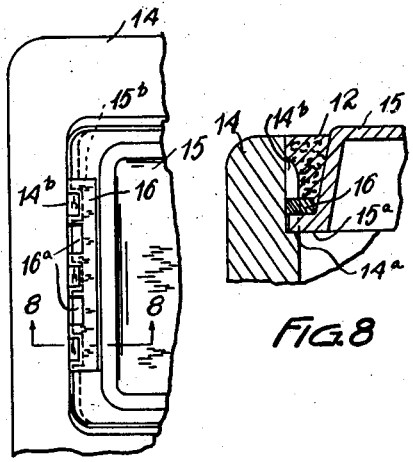

Figs. 5, 6, and 7 are fragmentary plan views showing a modification; Fig. 5 showing the cover located in the top of the cell compartment but omitting the locking strip; Fig. 6 showing the locking strip inserted but not yet in locking position; and Fig. 7 showing the locking strip moved laterally to locking position; and Fig. 8 is a sectional view similar to Fig. 3 showing the locking strip in locking position.

The present invention is susceptible of many modifications not only in the form and the manner of application of the locking strips but also in their number and location with respect to the sides and ends of the cover. For example, the invention is applicable to a battery having a single cell and therefore a single cover, or to a multi-cell battery having one cover for all the cells or a plurality of covers individual to the different cells. Furthermore, the number of locking strips may be varied as found desirable or necessary. For example, the cover may be locked in position by two or these strips applied to the ends of the cover or by two of them applied to the sides of the cover, or by strips applied to both the sides and the ends or to the sides and one end, or to the ends and one side. In some instances it may be desired to use a single locking strip, as, for example, by slipping one end of the cover in a slot or under a fixed abutment at one end of the cell compartment and holding the other end down by one of the locking strips.

I have shown two forms of my invention in both of which the locking strips are moved to locking position by moving them horizontally with respect to the shoulders or abutments on the battery case, in one instance by moving the strips outwardly transversely of the flange, and in the other instance by moving them laterally lengthwise thereof and lengthwise of the flange on which they rest. The first arrangement is illustrated in Figs. 1 to 4 inclusive, and the latter in Figs. 5 to 8 inclusive.

In the drawing, 10 represents the battery case which, as before stated, may be for a battery having a single cell or any number of cells, but in this instance, the case here shown is for a multi-cell battery one of the cell covers of which is illustrated at 11. This cell cover has the usual skirt 11a provided at the bottom with an outwardly extending flange 11b which in this instance rests upon a shoulder 10a formed on the inner side of the case a distance from the top thereof equal substantially to the height of the cover 11. The cover is provided with a vent plug V and with openings for the terminal posts P which may be sealed in the cover in any of the usual ways and may be integrally fastened thereto as when lead-burned to sealing sleeves embedded in the cover. The cover is sealed in the case or compartment by sealing compound which is indicated at 12 in Figs. 3 and 8.

Figure 1:
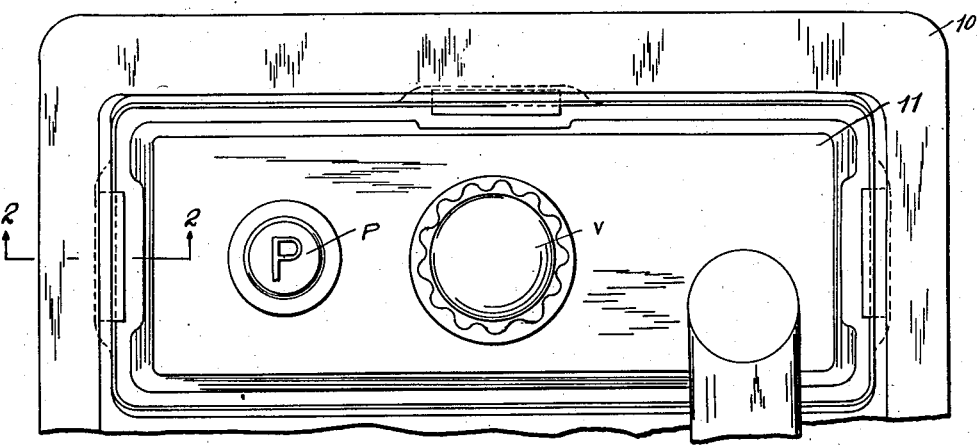
Fig. 1 is a top plan view of a portion of a storage battery showing one of the covers held in position by a cover lock formed in accordance with one form of the invention, the compound for sealing the cover being omitted.
Figure 2:
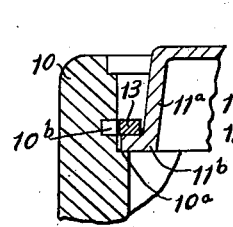
Fig. 2 is a detail sectional view substantially along the line 2—2 of Fig. 1, showing the locking strip placed on the flange of the cover but before being moved to locking position.
Figure 4:
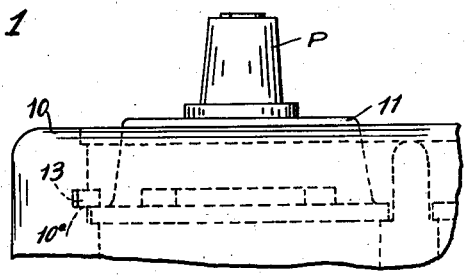
Fig. 4 is a fragmentary elevation of the upper portion of a battery looking toward the end of the cover with the cover lock in place.

In the embodiment shown in Figs. 1 to 4, the cover locks consist of strips 13 which may be formed of hard rubber and which are placed down on the lower marginal flange 11b of the cover before the sealing compound 12 is applied in the manner indicated in Fig. 2, and are then moved outwardly to the position shown in Figs. 3 and 4 in slots 10b which are of suitable length and depth to accommodate the strips 13 and are formed on the inner wall of the case or compartment thereof above the shoulder 10a a distance equal substantially to the thickness of the cover. After the strips have been moved outwardly, as shown in Figs. 3 and 4, the sealing compound 12 is applied and the latter will, of course, prevent dislodgment of the locking strips. The slots 10b may be formed in the case or container 10 when the latter is molded or may be subsequently milled therein. In Fig. 1 the locking strips are applied to the ends and one side of the cover, but, as already stated, their number and their points of application may be varied as desired.

In Figs. 5 to 8 inclusive, the inner walls of the case 14 are provided near the top and above a cover supporting shoulder 14a with short guide ribs 14b, these guide ribs 14b terminating a short distance above the lower marginal flange 15a of the cover here designated 15 when the latter is resting on the shoulder 14a of the case. The cover is provided with notches 15b (see Fig. 5) so that it may be slipped down onto the shoulder 14a. After the cover is placed in position and rests on the shoulder 14a, locking strips 16 which are also notched at 16a to accommodate the ribs 14b are slipped down over the ribs onto the flange 15a of the cover. Then the strips 16 are moved to locking position by moving them endwise along the flange from the position shown in Fig. 7 so that the notches 16a are no longer in alignment with the ribs 14b. Thus the lower ends of the ribs form abutments which, through the medium of the locking strips, prevent upward movement of the cover. After the strips have been moved to locking position, as shown in Fig. 7, the sealing compound 12 is applied, and here again it functions not only to seal the cover against leakage but also to hold the locking strips against displacement from locking position. The ribs 14b and the locking strips 16 may be provided where needed, as in the first instance.

Thus it will be seen that with either form of the invention herein illustrated the cover is effectively locked against upward movement so that the danger of breaking or loosening of the sealing compound 12 and leakage of the electrolyte are avoided. I do not desire to be confined to the details herein illustrated and described but aim in my claim to cover all modifications which do not involve a departure from the spirit and scope of the invention.

Having thus described my invention, I claim:

A storage battery comprising a case having a cover ledge beneath the top thereof and having ribs formed on its inner wall and terminating a predetermined distance above the cover ledge, a cover having a skirt portion with a lower marginal flange resting upon the ledge, the flange having notches to permit the cover to be lowered into the upper part of the battery case past said ribs, a cover lock in the form of a strip resting on and extending lengthwise of the cover flange and having portions lying between the latter and the lower ends of said ribs, said strip having notches corresponding in width and spacing to the ribs whereby the strip may be inserted from the top of the battery over the ribs down onto the flange and then slid endwise under the ribs until the notches are out of register with the ribs, and sealing compound filling the space between the upper part of the case and the skirt portion of the cover and embedding the locking strip.

LEO E. PUCHER.